UNITED STATES PATENT OFFICE.

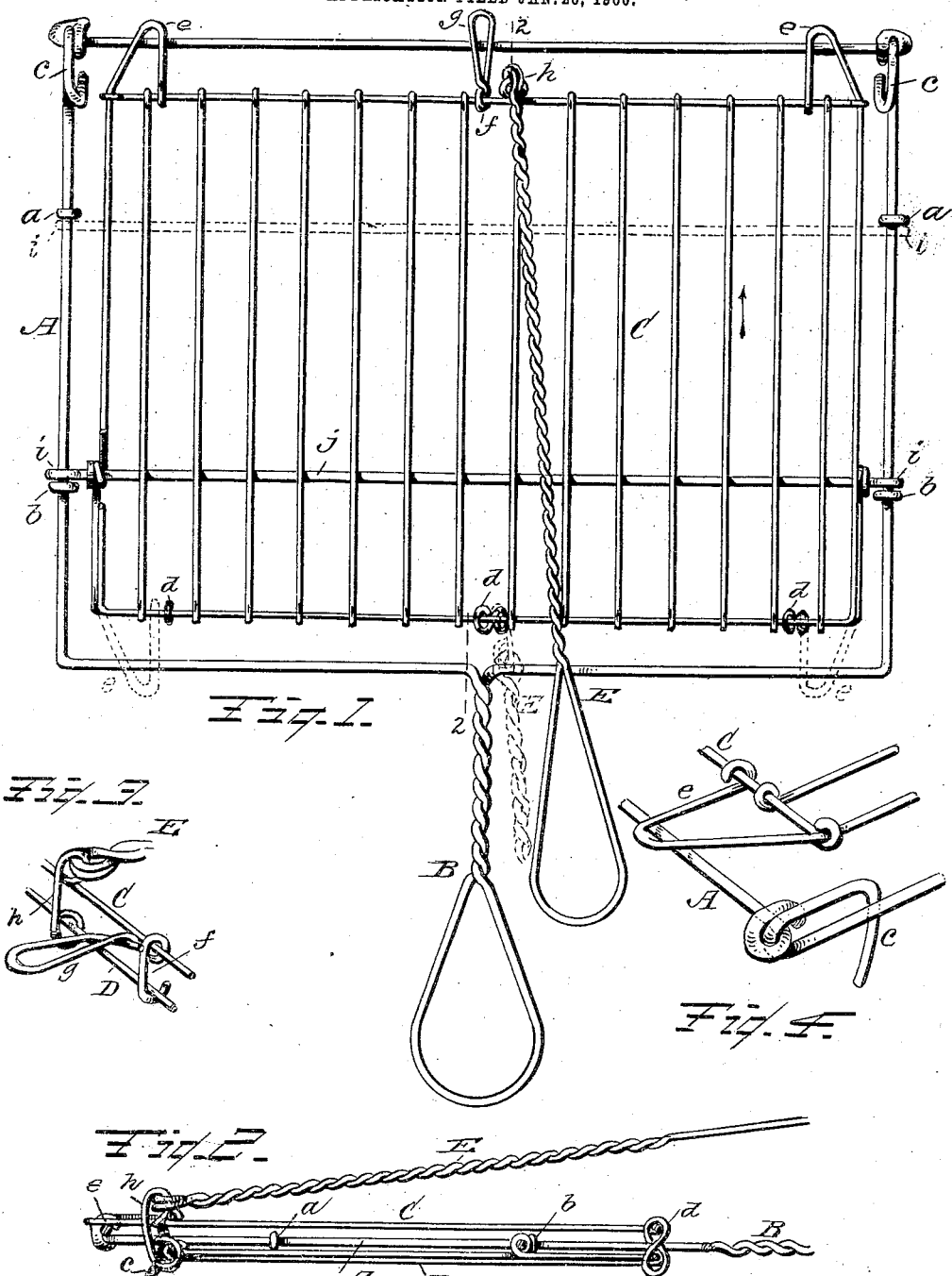

DE LEONARD RUGG, OF CATSKILL, NEW YORK.

BROILING AND TOASTING DEVICE.

No. 852,624.          Specification of Letters Patent.          Patented May 7, 1907.

Application filed January 26, 1906. Serial No. 297,960.

*To all whom it may concern:*

Be it known that I, DE LEONARD RUGG, a citizen of the United States, residing at Catskill, in the county of Greene and State of New York, have invented certain new and useful Improvements in Broiling and Toasting Devices; and I do hereby declare that the following is a full, clear, and exact description of the same, reference being had to the annexed drawings, making a part of this specification, and to the letters and figures of reference marked thereon.

The present invention has relation to that class of cooking devices or utensils usually constructed of wire and designed to hold between two hinged grating sections the article of food to be cooked over a fire, such as broiling or roasting meats, toasting bread, and like uses to which a device of this character would be found applicable, and the object of the invention is to improve this character of cooking utensil in the several details of construction whereby a more practical device is the result and possessing increased effectiveness in its use.

The invention consists in a broiling and toasting device constructed substantially as shown in the drawings and hereinafter described and claimed.

Figure 1 of the drawings is a top plan view of the broiling and toasting device constructed in accordance with my invention, the two hinged grating sections being shown as in a reversed position in dotted lines. Fig. 2 a side elevation partly in section with the looped ends of the handles removed. Fig. 3 a detail view in perspective showing the wire catch to hold the two hinged grating sections together and the connection for the hand-lever. Fig. 4 a detail perspective view showing a portion of the stationary frame and one of the hinged grating sections with one of the supports connected thereto.

In the accompanying drawings A represents a stationary frame preferably constructed of wire and of any suitable size and form and is provided with a suitable handle B for holding the frame stationary upon the stove and over the fire-box thereof. The sides of the frame A have stops $a$ $b$ and the forward end of said frame is provided with hooks $c$ to engage the fire-box of the stove, the handle B when slightly pressed forward forcing the hooks up against the edge of the fire-box which will hold the frame perfectly rigid and stationary.

The two broiler or toaster sections C D are suitably hinged or loosely connected together at one end by double hooks $d$ or by any other means found most desirable, the section C having extended supports $e$ to rest upon the end bar or rod of the stationary frame A, as shown in Fig. 1 of the drawings.

Suitable means are provided for temporarily holding the two broiler or toaster sections C D together after the article of food has been placed between them, and one of many means that may be employed resides in the wire catch $f$, which may be provided with a short handle or thumb-piece $g$, as shown in Fig. 3 of the drawings. This catch is suitably connected to the cross bar or rod of one of the sections and adapted to engage the cross bar or rod of the opposite section, and as a temporary means of holding the two broiler or toaster sections together, any suitable catch or device may be substituted that will serve the purpose and admit of the two sections being released and separated when desired.

In order to operate the two broiler or toaster sections in their forward and reverse movement, one of said sections is provided with a hand-lever E loosely connected to the free end of one of the sections by means of a suitable link $h$ or by any other means found best adapted to the purpose.

The handle to the stationary frame as well as the hand-lever for operating the broiler or toaster sections and the supports $e$ for sustaining the forward ends of the sections and also the stops $a$ $b$ may be variously modified or changed as circumstances would require, although the construction shown is considered the most simple and practical.

After the article of food is placed between the sections C D, such as meat for broiling or bread for toasting as the case may be and the two sections secured together at their free ends, the frame A with the sections is placed upon the stove over the opening in the fire-box, and by means of the handle B the frame is pressed forward until the hooks $c$ engage the edge of the fire-box which will hold the frame perfectly rigid and stationary. The reversible and sliding broiler or toaster sections C D are in the position with relation to the frame A as shown in Fig. 1 of the drawings when the frame is first placed in position over the fire-box of the stove. When it is desired that the upper or uncooked side of the meat or untoasted side of the bread should be brought nearest to the fire in the fire-box of the stove, instead of turning over bodily the complete device, through the medium of the hand-lever E and by lifting up on the same, the two sections C D will slide forward in the direction of the arrow in Fig. 1 of the drawings, until the eyes $i$ of the transverse rod $j$ to which the section C is connected strike the stops $a$ which will form fulcrums for the sections. As the sections are brought to the position as above described, by bringing the hand-lever in a direction toward the handle of the stationary frame the sections will be raised up and in their movement will fall gently over to bring what was previously the upper side of the article of food to the lower side and in direct contact with the fire in the fire-box, and in this position the transverse rod $j$ will be in a position indicated by dotted line as will also the supports $e$, shown in Fig. 1 of the drawings, the sliding and reverse movement of the broiler or toaster sections being repeated as often as found necessary without the danger of the grease dropping upon the stove or making an unnecessary amount of smoke as would be the case were the device lifted up and turned over as in the old style of broiler or toaster.

Having now fully described my invention, what I claim as new and desire to secure by Letters Patent, is:—

1. A device for broiling and toasting articles of food, comprising a frame, a handle therefor, two reversibly mounted pivoted broiler or toaster sections slidably mounted on said frame and held against vertical movement, means on said frame to limit the sliding movement of the sections horizontally on the frame and to aid in the reversal of the sections, the pivot of reversal of the sections being eccentric with relation to the longitudinal center of the latter.

2. A device for broiling or toasting articles of food, comprising a stationary frame, hooks upon the forward end of said frame to engage the fire-box of the stove, and stops upon the side rods or bars of the frame, and broiler or toaster sections between which the food is held, a transverse member on which said sections are pivoted, said member having means engaging said side rods whereby said sections are slidable horizontally upon said frame, said stops upon the frame acting in conjunction with said engaging means to aid in turning the sections, and suitable supports upon one of the sections to engage the frame, substantially as and for the purpose described.

3. A device for broiling or toasting articles of food, comprising a flat stationary frame with a handle, two hinged broiler or toaster sections, a transverse member to which one of said sections is pivotally connected slidably mounted on the end bars of said frame, and having means to prevent vertical movement of said sections on the frame and a handle on one of said sections to move the said sections bodily back and forth on said frame and reverse the said sections.

In testimony whereof I affix my signature in presence of two witnesses.

DE LEONARD RUGG.

Witnesses:
ARTHUR M. MURPHY,
EDITH M. BRITT.